US012793249B2

(12) United States Patent
Roy et al.

(10) Patent No.: US 12,793,249 B2
(45) Date of Patent: Nov. 10, 2026

(54) IMAGE SIMULATION FOR SEMICONDUCTOR EXAMINATION

(71) Applicant: Applied Materials Israel Ltd., Rehovot (IL)

(72) Inventors: Saptarshi Roy, Kolkata (IN); Mahender Golla, Hyderabad (IN); Gangadharan Sivaraman, Chennai (IN); Kavitha Kavitha, Bengaluru (IN); Girish Kumar Ajmera, Bangalore (IN)

(73) Assignee: Applied Materials Israel Ltd., Rehovot (IL)

( * ) Notice: Subject to any disclaimer, the term of this patent is extended or adjusted under 35 U.S.C. 154(b) by 180 days.

(21) Appl. No.: 18/792,463

(22) Filed: Aug. 1, 2024

(65) Prior Publication Data

US 2026/0038137 A1 Feb. 5, 2026

(51) Int. Cl.
*G06K 9/00* (2022.01)
*G01N 21/88* (2006.01)
(Continued)

(52) U.S. Cl.
CPC ......... *G06T 7/593* (2017.01); *G01N 21/8851* (2013.01); *G01N 21/9501* (2013.01);
(Continued)

(58) Field of Classification Search
CPC ..... G06T 7/0002; G06T 7/0004; G06T 7/001; G06T 7/40; G06T 7/50; G06T 7/507; G06T 7/529; G06T 7/593; G06T 7/60; G06T 7/70; G06T 7/97; G06T 2207/20081; G06T 2207/20084; G06T 2207/30108; G06T 2207/30148; G06F 18/21; G06F 18/213; G06F 18/214; G06F 18/28; G06F 30/20; G06F 30/27; G06F 30/30; G06F 30/39; G06F 30/392; G06F 30/398;
(Continued)

(56) References Cited

U.S. PATENT DOCUMENTS 11,562,476 B2 * 1/2023 Peleg .................... G06T 7/0006
11,880,193 B2 * 1/2024 Yati ........................ G06T 7/0006
(Continued)

FOREIGN PATENT DOCUMENTS

WO 2016161370 A1 10/2016

*Primary Examiner* — Eric Rush
(74) *Attorney, Agent, or Firm* — Lowenstein Sandler LLP

(57) ABSTRACT

There is provided a system and method of image simulation for a semiconductor specimen. The method includes obtaining design data, and a plurality of actual images of the specimen acquired by an examination tool under a plurality of imaging configurations; processing the design data, the plurality of imaging configurations and the plurality of actual images by a first machine learning (ML) model, to obtain a set of estimated values for a set of physical properties characterizing the specimen, the physical properties being expected to result in varied image responses upon the specimen being imaged under different imaging configurations of the examination tool; and processing, by a second ML model, the design data, the set of estimated values, and a group of new imaging configurations of the examination tool, to obtain a group of synthetic images of the specimen simulating actual images acquired under the group of new imaging configurations.

20 Claims, 7 Drawing Sheets

(51) Int. Cl.

| | |
|---|---|
| ***G01N 21/95*** | (2006.01) |
| ***G06F 30/27*** | (2020.01) |
| ***G06T 7/00*** | (2017.01) |
| ***G06T 7/40*** | (2017.01) |
| ***G06T 7/593*** | (2017.01) |
| ***G06V 10/70*** | (2022.01) |
| ***G06V 10/82*** | (2022.01) |
| *G06F 119/02* | (2020.01) |

(52) U.S. Cl.

CPC ............ *G06F 30/27* (2020.01); *G06T 7/0004* (2013.01); *G06T 7/001* (2013.01); *G06T 7/40* (2013.01); *G06V 10/70* (2022.01); *G06V 10/82* (2022.01); *G06F 2119/02* (2020.01); *G06T 2207/20081* (2013.01); *G06T 2207/20084* (2013.01); *G06T 2207/30148* (2013.01)

(58) Field of Classification Search

CPC .... G06F 2119/02; G06V 10/10; G06V 10/70; G06V 10/72; G06V 10/774; G06V 10/82; G01N 21/88; G01N 21/8803; G01N 21/8851; G01N 21/9501; G01N 21/956; G01N 2021/8887; G01N 2021/8896; G01N 2021/95638; G01N 2021/95676

USPC ................ 382/100, 108, 141, 144–150, 152, 382/154–157, 159, 160, 190, 199, 224, 382/274–276, 286, 325; 430/30, 269, 430/309, 311, 312; 716/50–52, 54, 100, 716/101, 104, 106, 110–112, 136; 348/61, 86, 87, 121, 125, 126, 128; 703/6, 13, 14, 20, 22, 23

See application file for complete search history.

(56) References Cited

U.S. PATENT DOCUMENTS

| | | | | |
|---|---|---|---|---|
| 2022/0270212 | A1 | 8/2022 | Sah et al. | |
| 2022/0327364 | A1* | 10/2022 | Hunsche | G06T 7/0006 |
| 2024/0185058 | A1* | 6/2024 | Motamedi | G06N 3/08 |
| 2025/0259322 | A1* | 8/2025 | Schwarz | G06T 7/001 |

* cited by examiner

IMAGE SIMULATION FOR SEMICONDUCTOR EXAMINATION

TECHNICAL FIELD

The presently disclosed subject matter relates, in general, to the field of examination of a semiconductor specimen, and more specifically, to machine-learning based image simulation for examination of a specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Examination can be provided by using non-destructive examination tools during or after manufacture of the specimen to be examined. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally, or alternatively, each examination step can be repeated multiple times, for example for different wafer locations, or for the same wafer locations with different examination settings.

During the examination processes at various steps during semiconductor fabrication, examination images are acquired by the examination tools which are processed for the purpose of examination operations such as detecting and classifying defects on specimens, as well as performing metrology related operations.

Effectiveness of examination can be improved by automatization of process(es) such as, for example, defect detection, Automatic Defect Classification (ADC), Automatic Defect Review (ADR), image segmentation, automated metrology-related operations, etc. Automated examination systems ensure that the parts manufactured meet the quality standards expected and provide useful information on adjustments that may be needed to the manufacturing tools, equipment, and/or compositions, depending on the type of defects identified. In some cases, machine learning (ML) technologies can be used to assist the automated examination process so as to promote higher yield.

SUMMARY

In accordance with certain aspects of the presently disclosed subject matter, there is provided a computerized system of image simulation for a semiconductor specimen, the system comprising a processing circuitry configured to obtain design data of the semiconductor specimen; obtain a plurality of actual images of the specimen acquired by an examination tool under a plurality of imaging configurations; process the design data, the plurality of imaging configurations, and the plurality of actual images, by a first machine learning (ML) model, to obtain a set of estimated values for a set of physical properties characterizing the specimen, the set of physical properties expected to result in varied image responses upon the specimen being imaged under different imaging configurations of the examination tool; and process, by a second ML model, the design data, the set of estimated values, and a group of new imaging configurations of the examination tool, to obtain a group of synthetic images of the specimen simulating actual images acquired under the group of new imaging configurations.

In addition to the above features, the system according to this aspect of the presently disclosed subject matter can comprise one or more of features (i) to (xii) listed below, in any desired combination or permutation which is technically possible:

(i). The examination tool is an optical tool, and a given imaging configuration of the optical tool is characterized by values of a set of optical parameters comprising polarization, laser intensity, wavelength, and Coherent Light Control (CLC) masking.

(ii). The set of physical properties comprises material properties, roughness, reflectivity, depth, thickness, and pattern direction.

(iii). The first ML model is previously trained under supervised learning, using a training set comprising design data of a training specimen, a plurality of actual images of the training specimen acquired by the examination tool under the plurality of imaging configurations, and a set of ground truth values for the set of physical properties characterizing the training specimen.

(iv). The first ML model is previously trained by feeding the design data and the plurality of actual images of the training specimen with the plurality of imaging configurations as input to the first ML model, to obtain a set of predicted values for the set of physical properties; and optimizing the first ML model using a loss function, based on the set of predicted values and the set of ground truth values for the set of the physical properties.

(v). The first ML model is previously trained under unsupervised learning, using a training set comprising design data of a training specimen, and a plurality of actual images of the training specimen acquired by the examination tool under the plurality of imaging configurations.

(vi). The first ML model is previously trained under unsupervised learning by processing the design data, by a first subnetwork of the first ML model, to extract features representative of a set of predicted values for a set of physical properties; processing, by a second subnetwork of the first ML model, the plurality of imaging configurations and the extracted features, to obtain, as output of the first ML model, a plurality of predicted images of the training specimen corresponding to the plurality of imaging configurations; and optimizing the first ML model using a loss function, based on the plurality of actual images and the plurality of predicted images of the training specimen.

(vii). The second ML model is trained upon the first ML model being trained, using a training set comprising the design data of the training specimen, a set of estimated values for the set of physical properties of the training specimen provided by the first ML model, and a group of ground truth actual images acquired under the group of new imaging configurations of the examination tool.

(viii). The second ML model is trained by processing, by the second ML model, the design data of the training specimen, the group of new imaging configurations, and the set of estimated values for the set of physical properties, to obtain a group of predicted synthetic images; and optimizing the second ML model using a loss function based on the group of predicted synthetic images and the group of ground truth actual images.

(ix). The set of estimated values for the set of physical properties are outputted by the first ML model in a form of a set of output segmentation maps, each output segmentation map corresponding to a specific physical property and representative of the design data enriched by estimated values of the specific physical property.

(x). The processing circuitry is further configured to select, from the plurality of imaging configurations, an optimal imaging configuration based on the group of synthetic images, and configure the examination tool with the optimal imaging configuration for examining the specimen and one or more subsequent specimens.

(xi). At least one synthetic image from the group of synthetic images is usable as a reference image for defect-related examination of the specimen and one or more subsequent specimens.

(xii). The set of physical properties comprises a defect property indicative of defect spatial distribution on the specimen. The first ML model is previously trained using a training set pertaining to a training specimen with a known defect, the training set comprising design data of the training specimen, a plurality of actual images of the training specimen acquired by the examination tool under the plurality of imaging configurations, and a set of ground truth values for the set of physical properties including a ground truth defect map of the training specimen.

In accordance with other aspects of the presently disclosed subject matter, there is provided a computerized method of image simulation for a semiconductor specimen, the method comprising: obtaining design data of the semiconductor specimen; obtaining a plurality of actual images of the specimen acquired by an examination tool under a plurality of imaging configurations; processing the design data, the plurality of imaging configurations and the plurality of actual images by a first machine learning (ML) model, to obtain a set of estimated values for a set of physical properties characterizing the specimen, the set of physical properties expected to result in varied image responses upon the specimen being imaged under different imaging configurations of the examination tool; and processing, by a second ML model, the design data, the set of estimated values, and a group of new imaging configurations of the examination tool, to obtain a group of synthetic images of the specimen simulating actual images acquired under the group of new imaging configurations.

These aspects of the disclosed subject matter can comprise one or more of features (i) to (xii) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of image simulation for a semiconductor specimen, the method comprising obtaining design data of the semiconductor specimen; obtaining a plurality of actual images of the specimen acquired by an examination tool under a plurality of imaging configurations; processing the design data, the plurality of imaging configurations and the plurality of actual images by a first machine learning (ML) model, to obtain a set of estimated values for a set of physical properties characterizing the specimen, the set of physical properties expected to result in varied image responses upon the specimen being imaged under different imaging configurations of the examination tool; and processing, by a second ML model, the design data, the set of estimated values, and a group of new imaging configurations of the examination tool, to obtain a group of synthetic images of the specimen simulating actual images acquired under the group of new imaging configurations.

These aspects of the disclosed subject matter can comprise one or more of features (i) to (xii) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
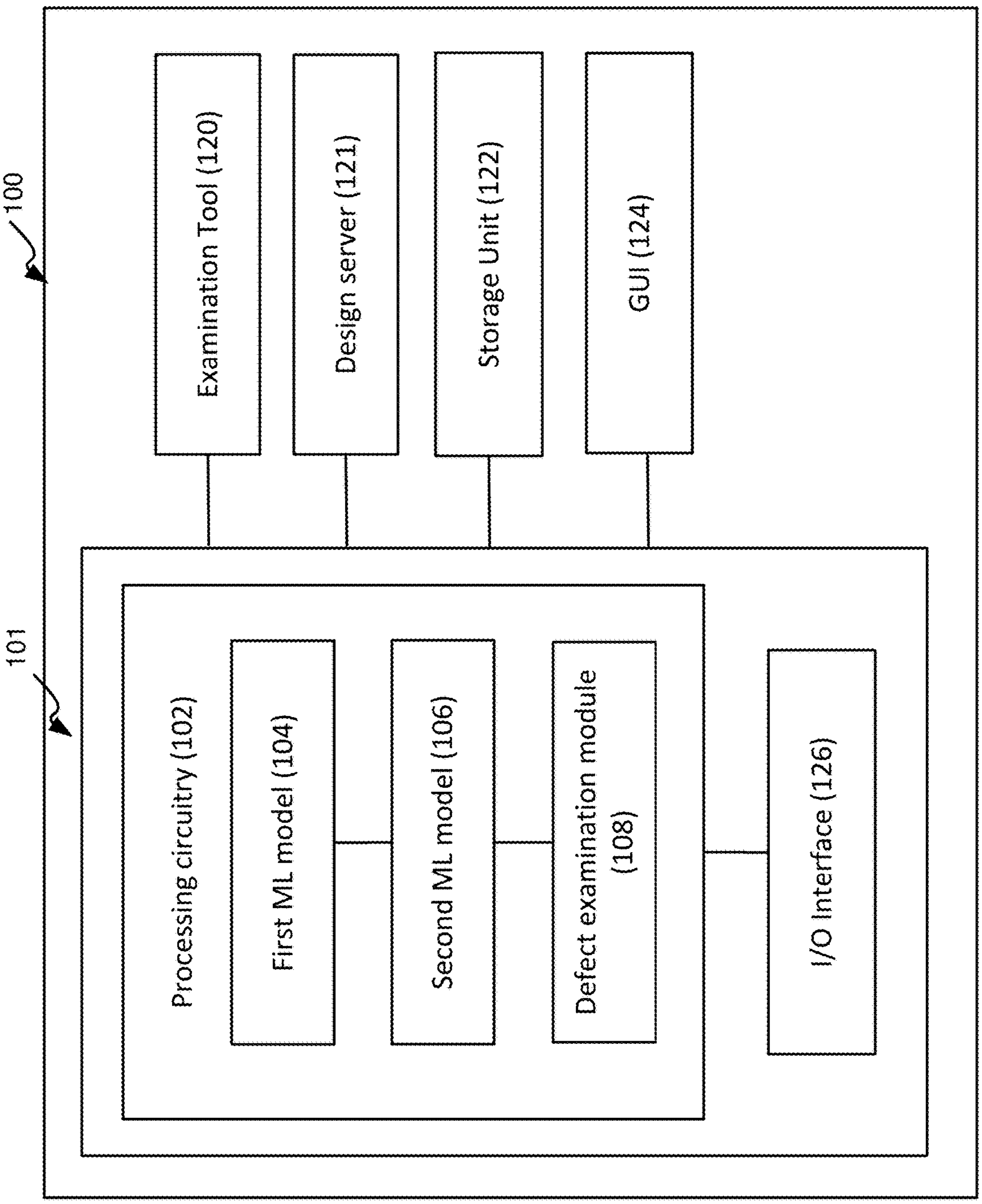
FIG. 1 illustrates a generalized block diagram of an examination system in accordance with certain embodiments of the presently disclosed subject matter.

The process of semiconductor manufacturing often requires multiple sequential processing steps and/or layers, some of which could possibly cause errors that may lead to yield loss. Examples of various processing steps can include lithography, etching, depositing, planarization, growth (such as, e.g., epitaxial growth), and implantation, etc. Various examination operations, such as defect-related examination (e.g., defect detection, defect review, and defect classification, etc.), and/or metrology-related examination (e.g., critical dimension (CD) measurements, etc.), can be performed at different processing steps/layers during the manufacturing process to monitor and control the process. The examination operations can be performed a multiplicity of times, for example after certain processing steps, and/or after the manufacturing of certain layers, or the like.

Defect-related examination (also referred to herein as defect examination) can generally employ a two-phase procedure, e.g., inspection of a specimen, followed by review of sampled locations of potential defects. During the first phase, the surface of a specimen is inspected by an inspection tool at relatively higher speed and lower resolution. Defect detection is typically performed by applying a defect detection algorithm to the inspection output. Various detection algorithms can be used for detecting defects on specimens, such as die-to-reference (D2R) (e.g., Die-to-Die (D2D)), Die-to-History (D2H), Die-to-Database (D2DB), and Cell-to-Cell (C2C), etc. A defect map is produced to show suspected locations on the specimen having high probability of a defect.

During the second phase, at least some of the suspected locations on the defect map are more thoroughly analyzed by a review tool with relatively higher resolution, for ascertaining whether a defect candidate is indeed a DOI, and/or determining different parameters of the DOIs, such as classes, thickness, roughness, size, and so on. The D2R methodology as described above can be similarly applied during the second phase, such as, e.g., in automatic defect review (ADR) systems.

Image simulation based on design data can be very useful in various examination operations. By way of example, simulated synthetic images can be used as reference images to be compared with corresponding inspection images during defect detection, instead of acquiring real reference images. By way of another example, simulated synthetic images for a plurality of imaging configurations can be analyzed so as to determine an optimal configuration of the examination tool for image acquisition.

However, creating a simulation model purely from a physics standpoint presents significant challenges due to the inherent complexity of the examination tools involved, such as, e.g., the optics system and the color variations due to unaccounted optical aberration. Additionally, the multi-layered structure and various materials of semiconductor devices and the interactions between these layers introduce further complexity in accurately modeling the imaging process. These factors contribute to deviations between the simulated images and the actual images captured by the tools, making it difficult to achieve the desired level of accuracy in the simulation.

In some cases, a machine learning (ML) based generative model can be a viable alternative to traditional physics-based models. ML models, particularly deep learning models, can be trained to convert detailed chip design specifications into synthetically generated scan images, taking into account the imaging configurations of the tool. By learning from a large dataset of actual images and their corresponding design specifications, the ML model can capture intricate patterns and variations that are difficult to represent using physics-based approaches. This allows for the generation of synthetic images that closely resemble the actual images produced by the examination tools.

Despite the potential advantages of ML-based generative models, several technical challenges remain. One significant challenge is the limited availability of complete chip design specifications due to Intellectual Property concerns of the customers. Typically, only high-level abstracted design data are available at the examination stage. The term "abstracted design data" or "abstracted design" as used herein refers to a simplified or generalized representation of the geometric layout and structural features of a semiconductor specimen. This data is typically provided in formats such as Computer-Aided Design (CAD) files in polygon format. These abstracted designs lack critical information such as material composition, layer depth, reflectivity, and other physical properties that are essential for accurate image simulation. Without this detailed information, the ML model may struggle to generate synthetic images that accurately represent the actual images captured by the tools. The absence of material-specific characteristics, for example, can lead to inaccuracies in simulating how different materials interact with light, resulting in less reliable synthetic images. Furthermore, variations in tool configurations can introduce additional discrepancies between the simulated and actual images, complicating the task of achieving high fidelity in the synthetic images.

Ensuring the accuracy and reliability of these synthetic images is essential, as they directly impact the subsequent specimen examination and analysis processes. By way of example, relying on inaccurate synthetic images can lead to unexpected errors and false alarms in the defect detection process, which can compromise the reliability of the inspection, leading to potential failures in the final product, and affecting yield.

Accordingly, certain embodiments of the presently disclosed subject matter address the above issues by proposing a method to estimate the missing design specifications and generate accurate synthetic images, even when complete chip design information is not accessible. Specifically, the present disclosure proposes a two-step approach for achieving accurate image simulation. The first step involves estimating the missing design specifications (e.g., physical characteristics of the specimen) based on abstract chip design data (such as CAD files), and the actual scan images from various imaging configurations of the examination tool. The second step utilizes these estimated physical characteristics incorporated with the abstract chip design data, and the imaging configurations, to simulate synthetic images that closely resemble the actual images produced by the examination tool, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect review, defect classification, nuisance filtration, segmentation, and/or metrology operations, such as, e.g., critical dimension (CD) measurements, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes, including, by way of non-limiting example, scanning (in a single or in multiple scans), imaging, sampling, reviewing, measuring, classifying, and/or other processes provided with regard to the specimen or parts thereof. Without limiting the scope of the disclosure in any way, it should also be noted that the examination tools can be implemented as inspection machines of various types, such as optical inspection machines, electron beam inspection machines (e.g., a Scanning Electron Microscope (SEM), an Atomic Force Microscopy (AFM), or a Transmission Electron Microscope (TEM), etc.), and so on.

The one or more examination tools 120 can include one or more inspection tools and one or more review tools. In some cases, an inspection tool can be configured to scan a specimen (e.g., an entire wafer, an entire die, or portions thereof) to capture inspection images (typically, at a relatively high-speed and/or low-resolution) for detection of potential defects (i.e., defect candidates). During inspection, the wafer can move at a step size relative to the detector of the inspection tool (or the wafer and the tool can move in opposite directions relative to each other) during the exposure, and the wafer can be scanned step-by-step along swaths of the wafer by the inspection tool, where the inspection tool images a part/portion (within a swath) of the specimen at a time. By way of example, the inspection tool can be an optical inspection tool. At each step, light can be detected from a rectangular portion of the wafer and such detected light is converted into multiple intensity values at multiple points in the portion, thereby forming an image corresponding to the part/portion of the wafer. For instance, in optical inspection, an array of parallel laser beams can scan the surface of a wafer along the swaths. The swaths are laid down in parallel rows/columns contiguous to one another, to build up, swath-at-a-time, an image of the surface of the wafer. For instance, the tool can scan a wafer along a swath from up to down, then switch to the next swath and scan it from down to up, and so on and so forth, until the entire wafer is scanned and inspection images of the wafer are collected.

In some cases, a review tool can be configured to capture review images of at least some of the defect candidates detected by inspection tools for ascertaining whether a defect candidate is indeed a defect of interest (DOI). Such a review tool is usually configured to inspect fragments of a specimen, one at a time (typically, at a relatively low-speed and/or high-resolution). By way of example, the review tool can be an electron beam tool, such as, e.g., a scanning electron microscope (SEM), etc. An SEM is a type of electron microscope that produces images of a specimen by scanning the specimen with a focused beam of electrons. The electrons interact with atoms in the specimen, producing various signals that contain information on the surface topography and/or composition of the specimen. An SEM is capable of accurately inspecting and measuring features during the manufacture of semiconductor wafers.

The inspection tool and review tool can be different tools located at the same or at different locations, or a single tool operated in two different modes. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools. In some cases, at least one of the examination tools has metrology capabilities and can be configured to capture images and perform metrology operations on the captured images. Such an examination tool is also referred to as a metrology tool.

According to certain embodiments of the presently disclosed subject matter, the examination system 100 comprises a computer-based system 101 operatively connected to the examination tool 120, and capable of image simulation based on design data. System 101 is also referred to as an image simulation system.

System 101 includes a processing circuitry 102 operatively connected to a hardware-based I/O interface 126 and configured to provide processing necessary for operating the system, as further detailed with reference to FIGS. 2-5. The processing circuitry 102 can comprise one or more processors (not shown separately) and one or more memories (not shown separately). The one or more processors of the processing circuitry 102 can be configured to, either separately or in any appropriate combination, execute several functional modules in accordance with computer-readable instructions implemented on a non-transitory computer-readable memory comprised in the processing circuitry. Such functional modules are referred to hereinafter as comprised in the processing circuitry.

According to certain embodiments, one or more functional modules comprised in the processing circuitry 102 of system 101 can include a first ML model 104, and a second ML model 106 operatively connected to each other. Optionally, in some cases, the processing circuitry 102 can further comprise a defect examination module 108 and/or an image analysis module. The first ML model 104 and the second ML model 106 were previously trained during a training/setup phase.

Specifically, the processing circuitry 102 can be configured to obtain, via an I/O interface 126, obtain design data of the semiconductor specimen, and a plurality of actual images of the specimen acquired by an examination tool (e.g., the examination tool 120) under a plurality of imaging configurations. The first ML model 104 can be used to process the design data, the plurality of imaging configurations and the plurality of actual images, to obtain a set of estimated values for a set of physical properties characterizing the specimen. The set of physical properties are expected to result in varied image responses upon the specimen being imaged under different imaging configurations of an examination tool.

The second ML model 106 can be used to process the design data, the set of estimated values of the physical properties, and a group of new imaging configurations of the examination tool, to obtain a group of synthetic images of the specimen simulating actual images acquired under the group of new imaging configurations.

In some embodiments, the synthetic images and/or the first/second simulation model can be used for various additional examination applications. By way of example, the image analysis module (as optionally comprised in system 101) can be configured to select, from the group of new imaging configurations, an optimal imaging configuration based on the group of synthetic images, and configure the examination tool with the optimal imaging configuration for examining the specimen and one or more subsequent specimens. By way of another example, the defect examination module 108 (as optionally comprised in system 101) can be configured to use at least one synthetic image as a reference image for defect-related examination of the specimen and one or more subsequent specimens. By way of yet further example, the first ML model, upon being specifically trained, can be used for defect detection, as will be detailed below with reference to FIGS. 2 and 3.

In some cases, the first ML model 104, the second ML model 106, and the other optional functional module(s) can be regarded as part of an examination recipe usable for performing runtime examination operations for semiconductor specimens, including defect detection/review, and metrology operations, etc., based on design data and acquired runtime images of a specimen.

In some embodiments, system 101 can be configured as a training system capable of training the first ML model 104 and/or the second ML model 106 during a training/setup phase. In such cases, one or more functional modules comprised in the processing circuitry 102 of system 101 can include a training module (not illustrated in the figure), and the first ML model 104 and the second ML model 106 to be trained (i.e., the initially constructed ML models that are not yet trained). Specifically, the training module can be configured to obtain a respective training set, and use the training set to train the first and/or the second model, as will be detailed below.

According to certain embodiments, the first ML model and/or the second ML model can be implemented as various types of machine learning models, such as, e.g., decision tree, Support Vector Machine (SVM), Artificial Neural Network (ANN), regression model, Bayesian network, or ensembles/combinations thereof etc. The learning algorithms used by the ML models can be any of the following: supervised learning, unsupervised learning, self-supervised, semi-supervised learning, or a combination thereof, etc. The presently disclosed subject matter is not limited to the specific types of the ML models or the specific types of learning algorithms used by the ML models.

By way of example, in some cases, the ML models can be implemented as a deep neural network (DNN). DNN can comprise multiple layers organized in accordance with respective DNN architecture. By way of non-limiting example, the layers of DNN can be organized in accordance with architecture of a Convolutional Neural Network (CNN), Recurrent Neural Network, Recursive Neural Networks, autoencoder, Generative Adversarial Network (GAN), variations of any of the above, or otherwise. Optionally, at least some of the layers can be organized into a plurality of DNN sub-networks. Each layer of DNN can include multiple basic computational elements (CE) typically referred to in the art as dimensions, neurons, or nodes.

The weighting and/or threshold values associated with the CEs of a DNN and the connections thereof can be initially selected prior to training, and can be further iteratively adjusted or modified during training to achieve an optimal set of weighting and/or threshold values in a trained DNN. After each iteration, a difference can be determined between the actual output produced by DNN module and the target output associated with the respective training set of data. The difference can be referred to as an error value. Training can be determined to be complete when a loss/cost function indicative of the error value is less than a predetermined value, or when a limited change in performance between iterations is achieved. A set of input data used to adjust the weights/thresholds of a DNN is referred to as a training set.

It is noted that the teachings of the presently disclosed subject matter are not bound by specific architecture of the ML models as described above.

It is to be noted that while certain embodiments of the present disclosure refer to the processing circuitry 102 being configured to perform the above recited operations, the functionalities/operations of the aforementioned functional modules can be performed by the one or more processors in processing circuitry 102 in various ways. By way of example, the operations of each functional module can be performed by a specific processor, or by a combination of processors. The operations of the various functional modules, such as the first/second ML model processing, image analysis, and defect examination, etc., can thus be performed by respective processors (or processor combinations) in the processing circuitry 102, while, optionally, these operations may be performed by the same processor. The present disclosure should not be limited to being construed as one single processor always performing all the operations.

In some cases, additionally to system 101, the examination system 100 can comprise one or more examination modules, such as, e.g., defect detection module, nuisance filtration module, Automatic Defect Review Module (ADR), Automatic Defect Classification Module (ADC), metrology operation module, and/or other examination modules which are usable for examination of a semiconductor specimen. The one or more examination modules can be implemented as stand-alone computers, or their functionalities (or at least part thereof) can be integrated with the examination tool 120. In some cases, the output of system 101, e.g., the set of physical properties, the synthetic images, and the optimal imaging configuration, etc., can be provided to the one or more examination modules (such as the ADR, ADC, etc.) for further processing. In some cases, the functional modules 104, 106, and 108 can be comprised in the one or more examination modules for the purpose of image simulation and examination. Optionally, these functional modules can be shared between the examination modules or, alternatively, each of the one or more examination modules can comprise its own functional modules.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120, such as, e.g., the acquired images, and the training set(s), as described above. In some cases, system 100 can also comprise a design server 121 configured to store design data of semiconductor specimens to be examined. Accordingly, the input data as required can be retrieved from the storage unit 122 and the design server 121, and provided to the processing circuitry 102 for further processing. The output of the system 101, such as, e.g., the set of physical properties, the synthetic images, and the optimal imaging configuration, etc., can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including the images of the specimen, the estimate values of physical properties (in the form of segmentation maps), the defect examination results, etc. The user may be provided, through the GUI, with options of defining certain operation parameters, such as the physical properties of the specimen to be included in the set, the imaging configuration parameters, etc. The user may also view the operation results or intermediate processing results, such as, e.g., the estimated values of the set of physical properties, the generated synthetic images, and the optimal imaging configuration, etc., on the GUI.

In some cases, system 101 can be further configured to send, via I/O interface 126, the operation results to the examination tool 120 for further processing. In some cases, system 101 can be further configured to send the results to external systems, such as, e.g., Yield Management System (YMS) of a fabrication plant (fab). A yield management system (YMS) in the context of semiconductor manufacturing is a data management, analysis, and tool system that collects data from the fab, especially during manufacturing ramp ups, and helps engineers find ways to improve yield. YMS helps semiconductor manufacturers and fabs manage high volumes of production analysis with fewer engineers. These systems analyze the yield data and generate reports. YMS can be used by Integrated Device Manufacturers (IMD), fabs, fabless semiconductor companies, and Outsourced Semiconductor Assembly and Test (OSAT).

Those versed in the art will readily appreciate that the teachings of the presently disclosed subject matter are not bound by the system illustrated in FIG. 1. Each system component and module in FIG. 1 can be made up of any combination of software, hardware, and/or firmware, as relevant, executed on a suitable device or devices, which perform the functions as defined and explained herein. Equivalent and/or modified functionality, as described with respect to each system component and module, can be consolidated or divided in another manner. Thus, in some embodiments of the presently disclosed subject matter, the system may include fewer, more, modified and/or different components, modules, and functions than those shown in FIG. 1.

Each component in FIG. 1 may represent a plurality of the particular components, which are adapted to independently and/or cooperatively operate to process various data and electrical inputs, and for enabling operations related to a computerized examination system. In some cases, multiple instances of a component may be utilized for reasons of performance, redundancy, and/or availability. Similarly, in some cases, multiple instances of a component may be utilized for reasons of functionality or application. For example, different portions of the particular functionality may be placed in different instances of the component.

It should be noted that the examination system illustrated in FIG. 1 can be implemented in a distributed computing environment, in which one or more of the aforementioned components and functional modules shown in FIG. 1 can be distributed over several local and/or remote devices. By way of example, the examination tool 120 and the system 101 can be located at the same entity (in some cases hosted by the same device) or distributed over different entities. By way of another example, as described above, in some cases, system 101 can be configured as a training system for training the ML models, while in some other cases, system 101 can be configured as a runtime simulation system using the trained ML models. The training system and the runtime simulation system can be located at the same entity (in some cases hosted by the same device), or distributed over different entities, depending on specific system configurations and implementation needs.

In some examples, certain components utilize a cloud implementation, e.g., are implemented in a private or public cloud. Communication between the various components of the examination system, in cases where they are not located entirely in one location or in one physical entity, can be realized by any signaling system or communication components, modules, protocols, software languages, and drive signals, and can be wired and/or wireless, as appropriate.

It should be further noted that in some embodiments at least some of the examination tool 120, design server 121, storage unit 122 and/or GUI 124 can be external to the examination system 100 and operate in data communication with systems 100 and 101 via I/O interface 126. System 101 can be implemented as stand-alone computer(s) to be used in conjunction with the examination tool, and/or with the additional examination modules as described above. Alternatively, the respective functions of the system 101 can, at least partly, be integrated with one or more examination tools 120, thereby facilitating and enhancing the functionalities of the examination tools in examination-related processes.

While not necessarily so, the process of operations of systems 101 and 100 can correspond to some or all of the stages of the methods described with respect to FIGS. 2-5. Likewise, the methods described with respect to FIGS. 2-5 and their possible implementations can be implemented by systems 101 and 100. It is therefore noted that embodiments discussed in relation to the methods described with respect to FIGS. 2-5 can also be implemented, mutatis mutandis as various embodiments of the systems 101 and 100, and vice versa.

Figure 2:
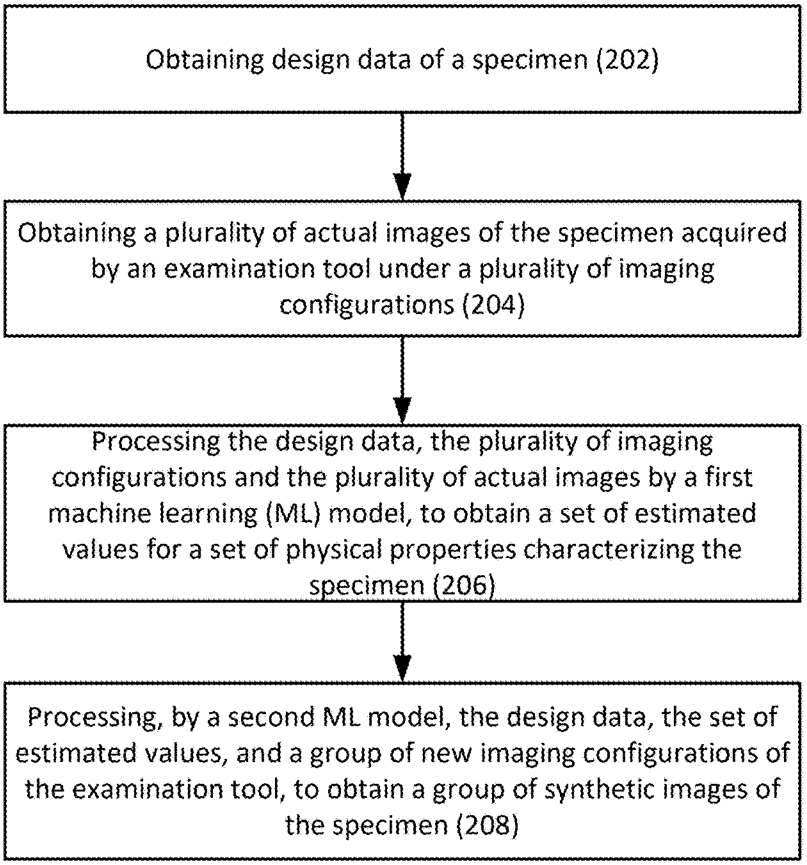
FIG. 2 illustrates a generalized flowchart of image simulation for a semiconductor specimen in accordance with certain embodiments of the presently disclosed subject matter.

Referring to FIG. 2, there is illustrated a generalized flowchart of image simulation for a semiconductor specimen in accordance with certain embodiments of the presently disclosed subject matter.

As described above, a semiconductor specimen is typically made of multiple layers. The examination process of a specimen can be performed a multiplicity of times during the fabrication process of the specimen, for example following the processing steps of specific layers. In some cases, a sampled set of processing steps can be selected for in-line examination, based on their known impacts on device characteristics or yield. Images of the specimen or parts thereof can be acquired at the sampled set of processing steps to be examined.

For the purpose of illustration only, certain embodiments of the following description are described with respect to design data and images of a given processing step/layer of the sampled set of processing steps. Those skilled in the art will readily appreciate that the teachings of the presently disclosed subject matter can be performed following any layer and/or processing steps of the specimen. The present disclosure should not be limited to the number of layers comprised in the specimen and/or the specific layer(s) to be examined.

Design data of a semiconductor specimen can be obtained (202) (e.g., by the processing circuitry 102 from the design server 121). Design data used herein refers to the abstracted chip design information that describes the geometric and structural design layout of a semiconductor device, often represented in formats such as, e.g., Computer-Aided Design (CAD) data/files, including polygon representations of the various layers and structural features of the device. Design data can be represented in various formats, such as Layout Exchange Format (LEF), Design Exchange Format (DEF), Graphic Data System (GDSII), and Open Artwork System Interchange Standard (OASIS).

As described above, this design data that is available during the examination stage only reflects part of the complete design specification of the specimen, i.e., the high-level abstracted design of the specimen. By way of example, CAD data, such as those in formats like GDSII or OASIS, primarily focus on the 2D geometric layout and spatial arrangement of features on a semiconductor wafer. It provides detailed information on the planar (x-y) coordinates and shapes of the various features/patterns, ensuring that the design meets the required specifications and manufacturability constraints.

Such design data typically does not encompass detailed physical properties characterizing the specimen, which are proprietary process-specific data used during the fabrication/manufacturing process of the specimen. These physical properties can include material properties (such as e.g., types of materials, their composition, electrical properties, refractive indices, and other relevant physical and chemical properties), roughness (e.g., the texture of a surface, as a measure of small-scale variations in height), reflectivity (e.g., a measure of how much light or radiation is reflected by a surface), vertical dimensions of layers and features thereof (such as, e.g., depth and thickness of different layers/features), as well as certain 2D geometric properties that may be missing from the design data, such as pattern direction (e.g., the alignment and orientation of various features on each layer), etc.

These missing properties are essential in accurately simulating how the semiconductor specimen interacts with the examination tools. In particular, these physical properties (or at least some thereof) may be responsible for causing varied image responses upon the specimen being imaged under different imaging configurations of an examination tool. The present disclosure proposes to estimate these missing properties based on machine learning, for purposes of accurate design-based image simulation, as will be detailed below.

Continuing with the description of FIG. 2, a plurality of actual images of the specimen can be obtained (204) (e.g., by the processing circuitry 102 from the examination tool 120). The plurality of actual images are acquired by an examination tool under a plurality of imaging configurations. An actual image refers to an original image of the semiconductor specimen that is actually acquired by an examination tool (e.g., by an inspection tool, or a review tool), or any derivatives of the original image (such as resulting from any pre-processing of the original image).

The actual images can be acquired by an inspection tool or a review tool as described above. For instance, an actual image can be an optical image acquired by an optical inspection tool, or an electron beam (e-beam) image acquired by an electron beam tool during in-line examination of the specimen, depending on the specific examination modality thereof. A semiconductor specimen here can refer to a semiconductor wafer, a die, or parts thereof, that is fabricated and examined in the fab during a fabrication process thereof. An actual image or original image refers to an image capturing at least part of the specimen. By way of example, an image can capture a region or a structure that is of interest to be examined on the specimen.

The actual images are acquired by the examination tool under a plurality of imaging configurations. The term "imaging configuration" as used herein refers to a specific set of operational parameters and settings of an examination tool that determine how the tool acquires images of a specimen. These parameters can vary depending on the type of examination tool being used and are crucial in defining the conditions under which the imaging takes place. Imaging configurations are generally designed to optimize the visibility and detectability of features and defects in the acquired images of the specimen.

By way of example, in cases where the examination tool is an optical tool, the plurality of imaging configurations of the optical tool can be characterized by different values of a set/collection of optical parameters comprising polarization, laser intensity, wavelength, and Coherent Light Control (CLC) masking (e.g., the use of masks to control the coherence and distribution of light on the specimen), etc. By way of another example, in cases where the examination tool is an electron beam tool, the plurality of imaging configurations of the e-beam tool can be characterized by different values of a set/collection of optical parameters comprising landing energy, beam current, beam resolution, electron source, numerical aperture (NA) electrostatic field, voltage, and detector settings.

It should be noted that the terms "actual images", "original images" or "images actually acquired" used herein refer to real images that are directly obtained from an examination tool during the inspection or review process. These images are captured by devices such as optical inspection tools, electron beam tools, or other similar examination equipment, and represent the true visual data of the semiconductor specimen at the time of acquisition. On the other hand, the terms "synthetic images," "simulated images" or "simulated synthetic images" used herein refer to images that are artificially generated, typically using machine learning models such as the second ML model that will be described below. These generated images are produced through computational methods and are intended to replicate the actual images for various purposes, such as image analysis, reference creation, defect detection, or tool configuration, etc.

The design data, the plurality of imaging configurations, and the plurality of actual images can be processed (206) by a first ML model (e.g., the first ML model 104), to obtain a set of estimated values for a set of physical properties characterizing the specimen. The set of physical properties are selected as those expected to result in varied image responses upon the specimen being imaged under different imaging configurations of the examination tool. That is to say, the selected physical properties, such as material type, surface roughness, reflectivity, etc., may have significant impacts on how the specimen interacts with the imaging tool. When the imaging configurations, like light wavelength, polarization, and intensity in optical tools or beam energy and current in electron beam tools, are varied, these physical properties cause the images to change in distinct and recognizable ways. By selecting properties that lead to noticeable differences in the resulting images under various configurations, the ML models can more effectively learn the relationships between the physical characteristics of the specimen and the observed image patterns in response to a particular imaging configuration. This variation in image responses is necessary for accurately inferring the underlying physical properties from the imaging data.

The first ML model referred to in block 206 is a pre-trained ML model that has been previously trained in a training phase for estimation of the set of physical properties of the specimen.

The underlying principle of the first ML model is to use variations in imaging configurations to infer the physical properties of the semiconductor specimen. By capturing images of the specimen under different controlled imaging settings/configurations, the model can learn what kind of physical properties/characteristics may result in a given set of actually scanned images under a given set of imaging configurations. This process is akin to illuminating an object from multiple angles and analyzing the resulting shadows to determine its shape and features. In the context of the present disclosure, the design data provides a geometric blueprint of the specimen, while the plurality of actual images, taken under varied imaging configurations, offer insights into how different physical properties, such as material composition, depth, and surface roughness, influence the image formation. By processing this combined information, the ML model learns to map the design data, imaging configuration variations, and the resulting actual images, to the corresponding physical property values.

During training, the model may be exposed to a training data set comprising various examples of design data, imaging configurations, and ground truth physical properties, enabling it to identify patterns and correlations. Once trained, the model can estimate the physical properties of new specimens by interpreting how their design data and imaging responses under different configurations correspond to known physical characteristics. This capability allows for accurate characterization of the specimen, facilitating the next step of generation of realistic synthetic images, as will be described below.

Figure 3:
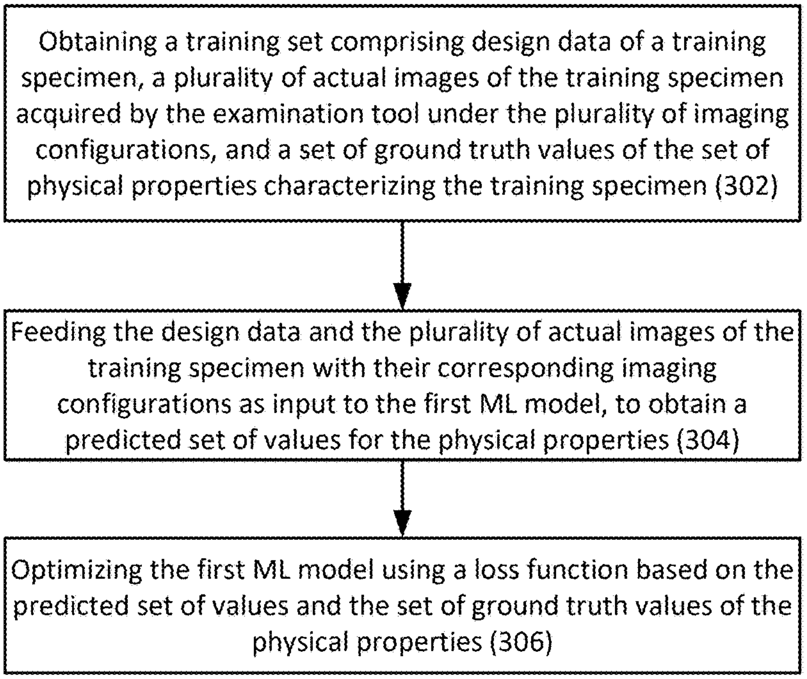
FIG. 3 illustrates a generalized flowchart of training the first ML model using supervised learning in accordance with certain embodiments of the presently disclosed subject matter.

The first ML model can be trained in various manners using supervised learning or unsupervised learning. By way of example, in some cases, the first ML model can be trained using supervised learning. FIG. 3 illustrates a generalized flowchart of training the first ML model using supervised learning in accordance with certain embodiments of the presently disclosed subject matter.

Specifically, a training set can be obtained (302), comprising design data of a training specimen, a plurality of actual images of the training specimen acquired by the examination tool under the plurality of imaging configurations, and a set of ground truth values of the set of physical properties characterizing the training specimen. In some cases, the plurality of imaging configurations in the training set should be sufficiently diverse and representative to ensure that the model can learn from various images that reflect comprehensive information on the physical properties of the training specimen. This diversity in imaging configurations allows the model to effectively approximate and estimate the values of the set of physical properties across different scenarios. The ground truth values of the physical properties can be typically obtained through detailed physical measurements and analyses of the training specimen.

The design data and the plurality of actual images of the training specimen, along with the plurality of imaging configurations used to acquire those images, are fed (304) as input to the first ML model. The first ML model can process the input and provide, as output, a set of predicted values for the set of physical properties. The first ML model can be implemented with various model architectures, such as CNN, GAN, or other deep learning frameworks capable of capturing spatial patterns and relationships within the input data.

Taking CNN as an example, the CNN can process the input data through multiple layers of convolutional filters. These filters extract hierarchical features from the input images, starting with low-level features like edges and progressing to high-level features that capture more complex patterns and structures. The design data can be integrated at various stages of the network to provide contextual information. The output from the final layer of the CNN represents the predicted values of the physical properties.

In some cases, the predicted values of the set of physical properties can be outputted by the first ML model in a form of a set of output segmentation maps, each corresponding to a specific physical property and representative of the design data enriched by the specific physical property. The values in the output segmentation maps can be in various forms. For instance, in some cases, the values in a segmentation map can be in the form of continuous values (e.g., depth, thickness), or categorical values (e.g., material types), depending on the nature of the physical properties being estimated.

The first ML model can be optimized (306) using a loss function based on the set of predicted values and the set of ground truth values of the set of physical properties. By way of example, loss functions that can be used in this context may include Mean Squared Error (MSE), Mean Absolute Error (MAE), and distance-based metric, etc. These loss functions measure the discrepancy between the predicted values and the ground truth values, guiding the optimization process. The model parameters are iteratively adjusted using optimization algorithms to minimize the loss function. For instance, the optimization process may involve computing the gradient of the loss function with respect to the model parameters, and updating the parameters in the direction that reduces the loss. This iterative training may continue until a predefined criterion is met, such as, e.g., a specified number of epochs, convergence of the loss function, or achieving a minimum loss, etc. Early stopping can also be employed in some cases, where training is halted if the loss does not improve for a set number of consecutive epochs, preventing overfitting and ensuring the model generalizes well to new data.

Figure 4:
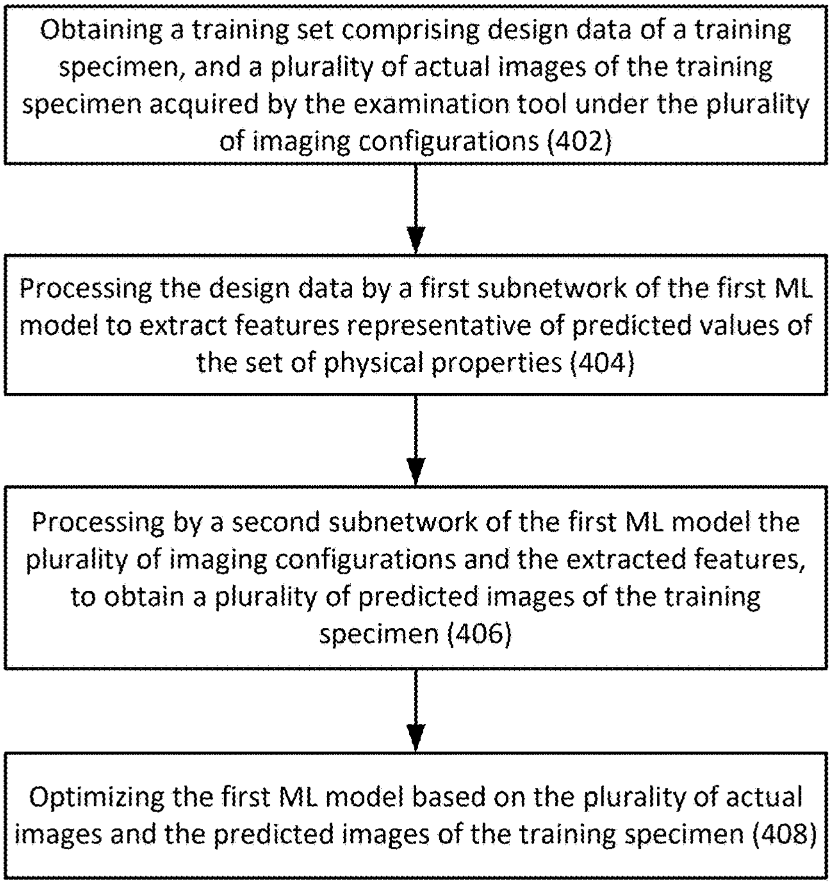
FIG. 4 illustrates a generalized flowchart of training the first ML model using unsupervised learning in accordance with certain embodiments of the presently disclosed subject matter.

In some other cases, the first ML model can be trained under unsupervised learning. FIG. 4 illustrates a generalized flowchart of training the first ML model using unsupervised learning in accordance with certain embodiments of the presently disclosed subject matter.

Specifically, a training set can be obtained (402), comprising design data of a training specimen, and a plurality of actual images of the training specimen acquired by the examination tool under the plurality of imaging configurations. As unsupervised learning is used, the training set does not include ground truth values of the set of physical properties characterizing the training specimen. Instead, the model learns to extract meaningful feature representations and patterns from the training data without explicit supervision, relying on the inherent structure within the data.

In some embodiments, the first ML model can be constructed to comprise two subnetworks, the first and second subnetworks operatively connected to each other. The design data can be processed (404) by the first subnetwork to extract features representative of a set of predicted values for the set of physical properties. By way of example, the first subnetwork can be implemented as a neural network (NN) such as an autoencoder.

Figure 7:
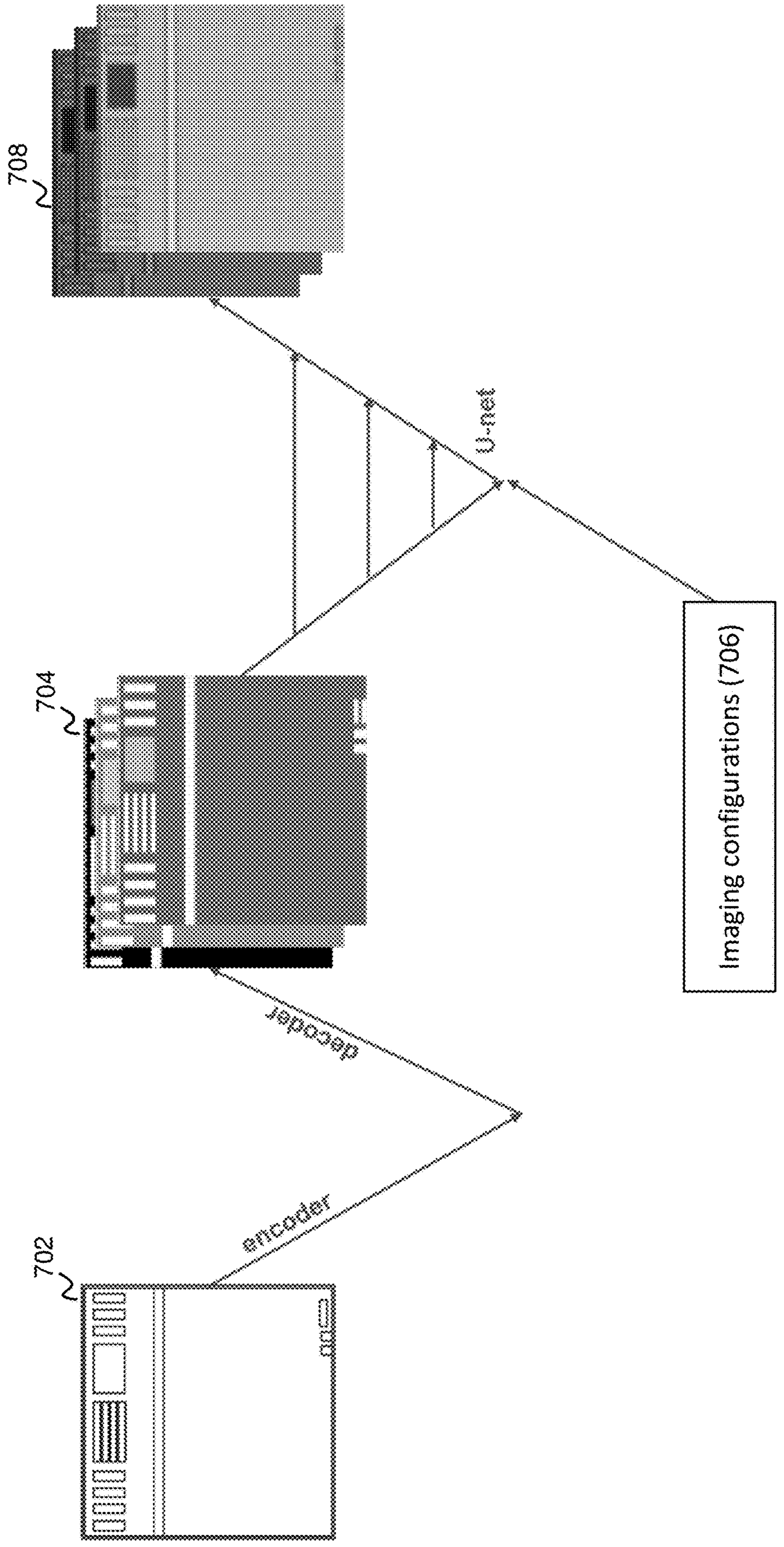
FIG. 7 shows a schematic illustration of a first ML model structure and the unsupervised learning thereof in accordance with certain embodiments of the presently disclosed subject matter.

FIG. 7 shows a schematic illustration of an exemplary first ML model and the unsupervised learning thereof in accordance with certain embodiments of the presently disclosed subject matter.

The first subnetwork is exemplified as an autoencoder, which comprises two parts: an encoder and a decoder. The encoder compresses the input data into a lower-dimensional latent representation, capturing essential features while reducing noise and redundancy. In the context of the present disclosure, the encoder takes the design data 702 as input and learns to represent it in a way that highlights features relevant to the physical properties. The decoder then reconstructs the input from this latent representation. The output of the decoder is used as the extracted features representative of the predicted values of the set of physical properties. By way of example, the extracted features, as the output of the decoder, can be represented in the form of a set of output segmentation maps 704, where each output segmentation map may correspond to a specific physical property (or in some cases, each may correspond to a combination of physical properties entangled within themselves) and representative of the design data enriched by the specific physical property (or the combination of properties).

The plurality of imaging configurations and the extracted features by the first subnetwork can be provided as input to the second subnetwork, and processed (406) by the second subnetwork to obtain, as output of the first ML model, a plurality of predicted images of the training specimen corresponding to the plurality of imaging configurations. By way of example, the second subnetwork can be implemented as a NN such as a U-net, as exemplified in FIG. 7.

A U-net is a type of convolutional neural network typically designed for image-to-image translation tasks, characterized by its symmetric U-shaped architecture. It typically comprises an encoder path that captures context, and a decoder path that enables precise localization. In the example of FIG. 7, the U-net takes the output segmentation maps 704 from the first subnetwork (e.g., the autoencoder), which represent the design data enriched with predicted physical properties, along with the imaging configurations 706 as input. The U-net processes these inputs through a series of convolutions and upsampling layers, effectively combining the spatial information from the imaging configurations with the enriched design data to generate predicted images 708 of the training specimen. The U-net architecture allows the model to produce accurate predicted images that reflect the estimated physical properties and the different image configurations.

The first ML model can be optimized (408) using a loss function based on the plurality of actual images and the predicted images of the training specimen. By way of example, loss functions that can be used in this context may include Mean Squared Error (MSE), Structural Similarity Index (SSIM), and perceptual loss, etc. The optimization process involves minimizing this loss function and adjusting the model parameters iteratively to improve the accuracy of the predicted images. Similarly, the training can continue until predefined criteria are met, such as convergence of the loss function, a set number of training epochs, or achieving a minimum difference between the actual and predicted images.

Upon being trained (either by supervised or unsupervised learning), the first ML model is capable of estimating the set of physical properties for new specimens in runtime based on their design data and actual images under various imaging configurations, providing essential input for the subsequent step of generating synthetic images that closely simulate the actual images acquired under different conditions, as will be described in further detail below with reference to FIGS. 2 and 8.

Figure 6:
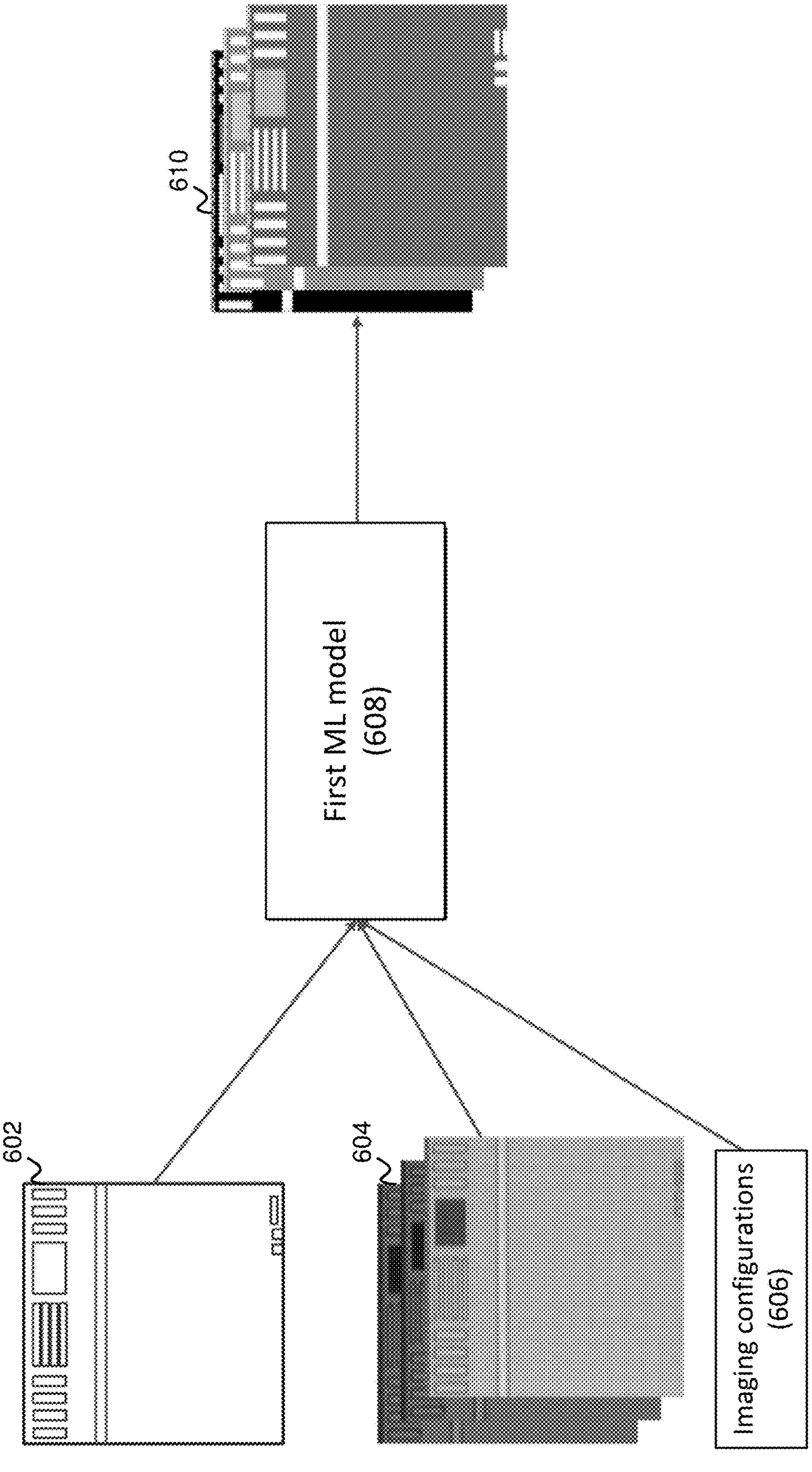
FIG. 6 shows a schematic illustration of runtime employment of the trained first ML model in accordance with certain embodiments of the presently disclosed subject matter.

FIG. 6 is a schematic illustration of runtime employment of the trained first ML model in accordance with certain embodiments of the presently disclosed subject matter.

As shown, the input to the first ML model 608, during runtime examination, includes design data 602 (illustrated in CAD format) of a specimen to be examined, a plurality of imaging configurations 606, and a plurality of actual images 604 acquired by the examination tool under the plurality of imaging configurations 606. The imaging configurations 606 are the same as the imaging configurations used for training the first ML model. The output of the first ML model 608 is a set of output segmentation maps 610 corresponding to the set of physical properties characterizing the specimen. Each segmentation map is representative of the design data 602 enriched by estimated values of a corresponding specific physical property. For instance, if the set of physical properties includes three properties, namely the type of materials, roughness, and reflectivity, the set of output segmentation maps will include three segmentation maps (e.g., pixel-wise segmentation maps) respectively corresponding to design data enriched with the estimated values of the three physical properties. Each pixel in a segmentation map can represent an estimated value of a corresponding physical property.

Continuing with the description of FIG. 2, upon the estimated values of the set of physical properties being obtained, the design data, the set of estimated values, and a group of new imaging configurations of the examination tool can be processed (208) by a second ML model, to obtain a group of synthetic images of the specimen simulating actual images acquired under the group of new imaging configurations. It is to be noted that the group of new configurations are considered "new" with respect to the plurality of imaging configurations used to acquire the plurality of actual images as described in block 204. In some cases, the group of new imaging configurations may comprise a relatively larger amount of imaging configurations with respect to the plurality of imaging configurations used for previous image acquisition in block 204, representing various possible configurations of the tool. It is to be noted that the group can be regarded as new as long as it includes at least some configurations that are different from the plurality of imaging configurations. In some cases, the group may possibly also include at least some of the plurality of configurations.

In cases where the estimated values are represented in the form of the output segmentation maps which are representative of the design data enriched by the estimated values of the physical properties, as the design data is already incorporated together with the estimated values, the two inputs can be provided in a consolidated form (e.g., in the form of the output segmentation maps) to the second ML model. It is to be noted that the second ML model referred to in block 208 is a pre-trained ML model that has been previously trained in a training phase for design-based image simulation.

The second ML model is intended to leverage the estimated physical properties and the new imaging configurations to accurately generate synthetic images that mimic the actual imaging process. By combining the design data with the enriched physical property information, the model can simulate how the specimen would appear under different imaging conditions. This approach enables the creation of highly accurate synthetic images that can be used for various examination and analysis purposes. The second ML model can effectively learn the complex mappings between the enriched design data, imaging configurations, and resulting images, ensuring that the generated synthetic images closely resemble the actual images that would be captured by the examination tool.

The second ML model can be constructed using various neural network architectures. By way of example, in some cases, the second ML model can be implemented as a generative adversarial network (GAN) or variations thereof. A GAN typically includes two components: a generator and a discriminator. The generator network is responsible for generating synthetic images based on the input design data, estimated physical properties, and imaging configurations. The discriminator network evaluates the realism/accuracy of the synthetic images by comparing them to the actual images and providing feedback to the generator. This adversarial training process helps the generator improve the quality and realism of the synthetic images over time.

Figure 5:
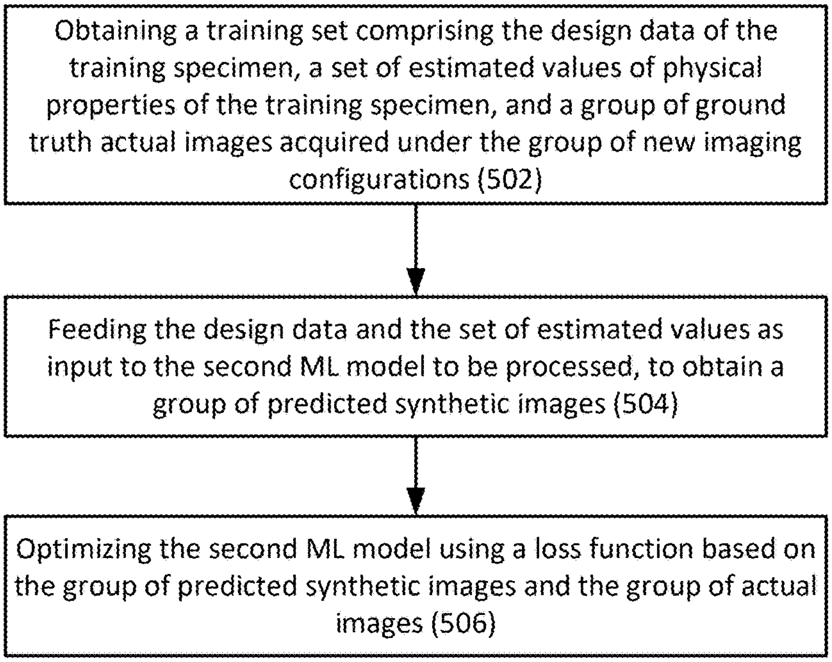
FIG. 5 illustrates a generalized flowchart of training the second ML model using supervised learning in accordance with certain embodiments of the presently disclosed subject matter.

The second ML model can be trained upon the first ML model being trained, or possibly trained together with the first ML model. In some embodiments, the second ML model can be trained under supervised learning. FIG. 5 illustrates a generalized flowchart of training the second ML model using supervised learning in accordance with certain embodiments of the presently disclosed subject matter.

Specifically, a training set can be obtained (502), comprising the design data of the training specimen, a set of estimated values for the set of physical properties of the training specimen provided by the first ML model, and a group of ground truth actual images acquired under the group of new imaging configurations of the examination tool.

The design data of the training specimen, the group of new imaging configurations and the set of estimated values for the set of physical properties can be fed (504) as input to the second ML model to be processed. Upon processing, the second ML model can provide, as output of the model, a group of predicted synthetic images simulating a group of actual images acquired under the group of new imaging configurations of the examination tool.

The second ML model can be optimized (506) using a loss function based on the group of predicted synthetic images and the group of actual images. The loss function can be configured to measure the discrepancy between the predicted synthetic images and the ground truth actual images, guiding the optimization process. The model parameters are iteratively adjusted using optimization algorithms to minimize the loss function. This iterative training continues until a predefined criterion is met, similarly as described above.

In the example of GAN, the generator takes the design data, estimated physical properties, and imaging configurations as input and produces synthetic images. The discriminator assesses these images, differentiating between real and synthetic ones, and provides feedback to the generator. The GAN can be optimized using two types of loss functions: a reconstruction loss and an adversarial loss. The reconstruction loss, such as Mean Squared Error (MSE), Sum of absolute difference (SAD), or Structural Similarity Index (SSIM), measures the difference between the synthetic images and the actual images, ensuring that the synthetic images accurately reflect the true physical properties and imaging configurations. The adversarial loss measures the ability of the discriminator to distinguish between real and synthetic images, encouraging the generator to produce increasingly realistic images. The generator and discriminator can be trained simultaneously, with the generator learning to produce more realistic images and the discriminator becoming better at distinguishing between real and synthetic images. The optimization process involves minimizing both the reconstruction loss and the adversarial loss.

It is to be noted that the term "minimize" or "minimizing" used herein refers to an attempt to reduce the difference or discrepancy represented by the loss function to a certain level/extent (which can be predefined), but not necessarily to reach the actual minimum.

Figure 8:
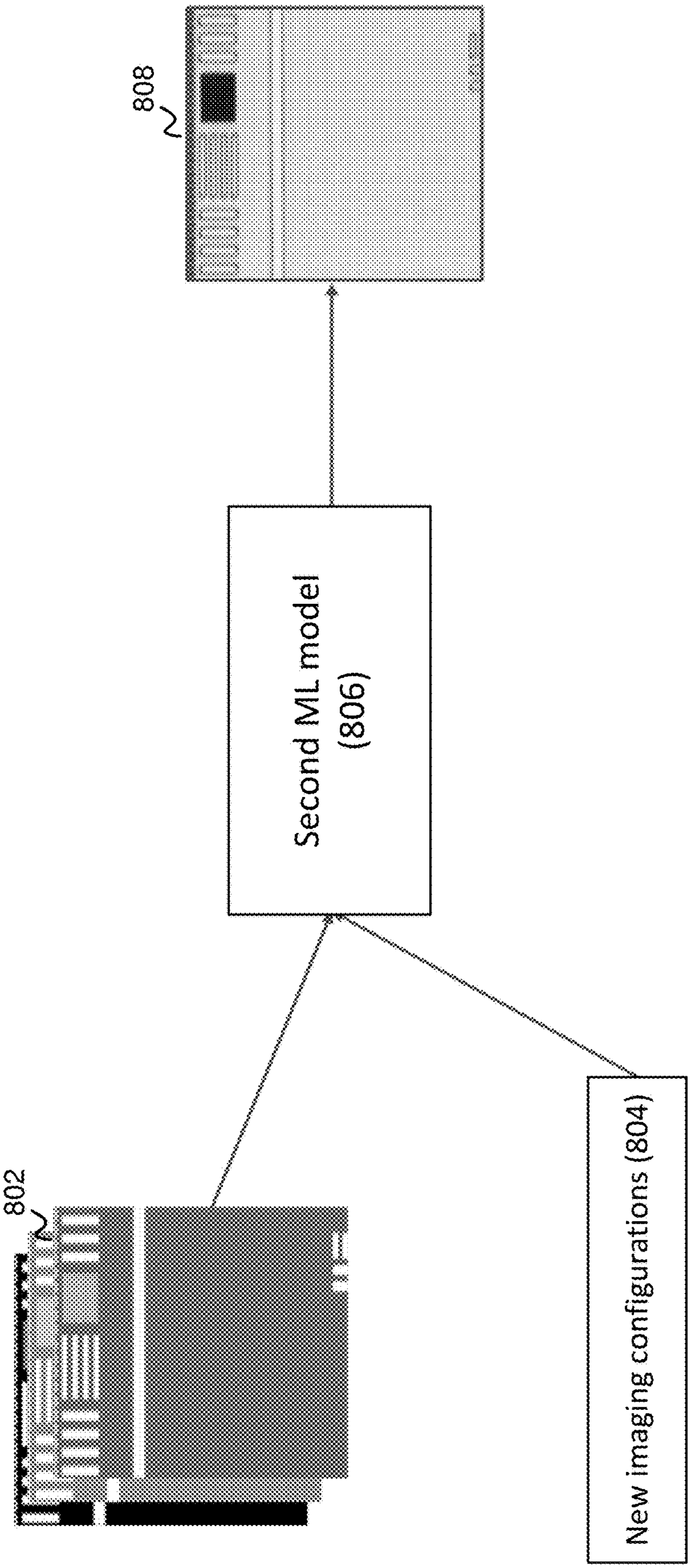
FIG. 8 is a schematic illustration of runtime employment of the trained second ML model in accordance with certain embodiments of the presently disclosed subject matter.

FIG. 8 is a schematic illustration of runtime employment of the trained second ML model in accordance with certain embodiments of the presently disclosed subject matter.

As shown, the input to the second ML model 806 during runtime examination includes the design data and the set of estimated values of the physical properties of the specimen to be examined (which are incorporated together in the present example to a consolidated form of segmentation maps 802 as provided by the first ML model).

The input further includes a group of new imaging configurations 804. The new imaging configurations 804 are the same as the new imaging configurations used for training the second ML model. The output of the second ML model 806 is a group of synthetic images 808 of the specimen simulating actual images acquired under the group of new imaging configurations.

Upon the first ML model and the second ML model being both trained and deployed in runtime, system 101 can be used in runtime examination for estimating values of physical properties of a specimen to be examined, and generate accurate synthetic images simulating actual images acquired under various imaging configurations.

The synthetic images as generated can be used for various examination applications. By way of example, in some cases, an optimal imaging configuration can be selected from the plurality of imaging configurations based on the group of synthetic images. For instance, the group of synthetic images can be analyzed, and the synthetic image that has the best quality for purpose of examination (e.g., in terms of the best contrast and/or signal-to-noise ratio (SNR)) can be selected. The imaging configuration corresponding to the selected image can be selected as the optimal imaging configuration. The examination tool can be configured with the optimal imaging configuration for examining the specimen and one or more subsequent specimens.

Figure 9:
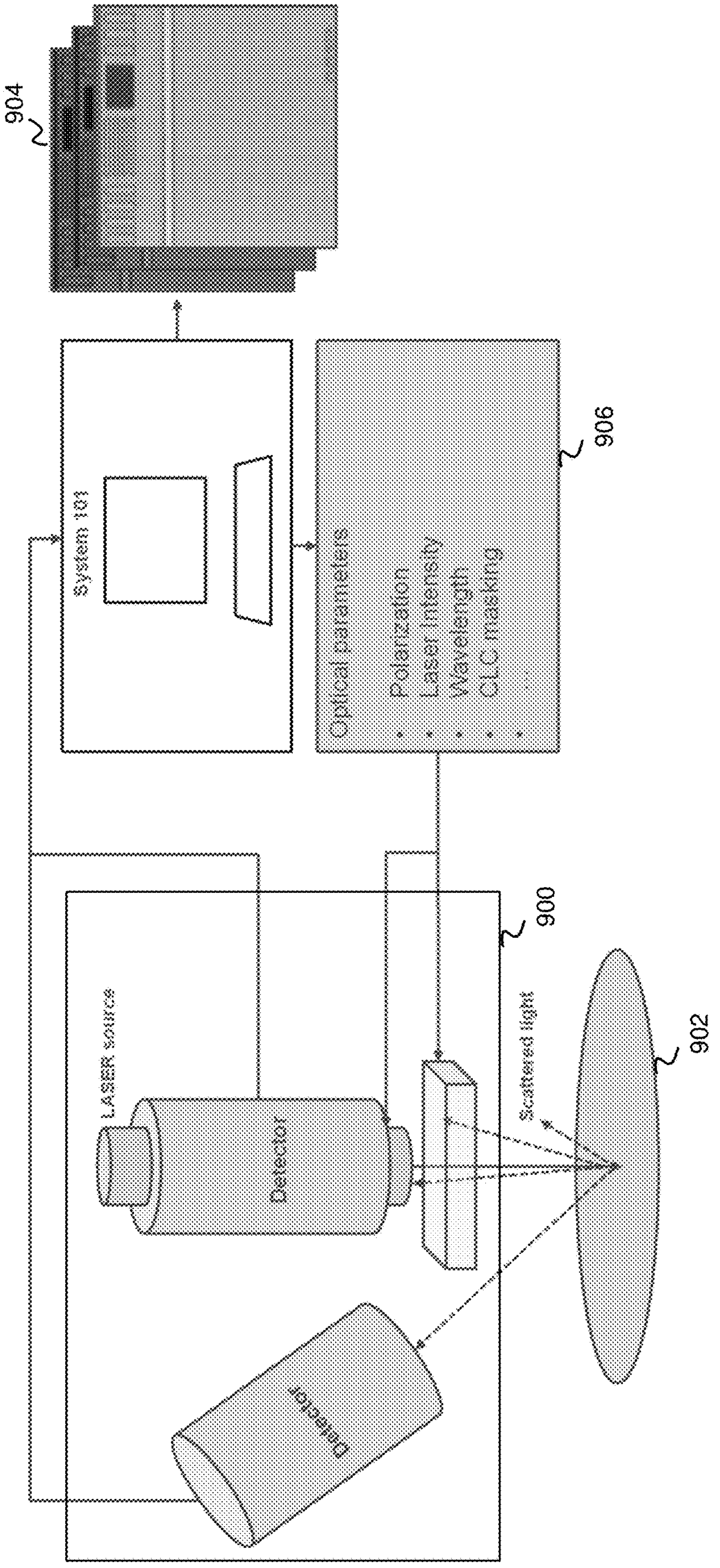
FIG. 9 shows a schematic diagram of an application of the image simulation system in accordance with certain embodiments of the presently disclosed subject matter.

FIG. 9 shows a schematic diagram of such an application of the image simulation system in accordance with certain embodiments of the presently disclosed subject matter.

An examination tool, exemplified as an optical inspection tool 900, inspects a specimen 902 under various optical imaging configurations. The scattered light is detected by detectors of the tool and converted into signals, thereby forming inspection images corresponding to the various imaging configurations. Image simulation system 101 receives the inspection images from the inspection tool 900, and performs image simulation operations based on design data in accordance with the process described above with reference to FIG. 2. Upon generating a group of synthetic images 904 corresponding to a group of new imaging configurations, the group of synthetic images can be analyzed and an optimal imaging configuration can be selected, e.g., corresponding to the synthetic image that has the best contrast/SNR. The optical inspection tool 900 can be configured according to the values of the optical parameters 906 in the optimal imaging configuration.

It should be noted that the term "optimal" or "best" used herein does not necessarily mean the absolute best or optimal in a strict mathematical or technical sense. Rather, these terms are intended to be broadly construed as indicating a configuration or result that is suitable or preferred for the intended purpose or context. In some cases, a configuration or result can be considered "optimal" or "best" when it meets a certain range or criteria, or exceeds a predefined threshold. The selection is based on the criteria and constraints considered during the evaluation process, such as contrast, signal-to-noise ratio (SNR), or other relevant factors.

In some cases, at least one synthetic image from the group of synthetic images can be used as a reference image for defect-related examination of the specimen and one or more subsequent specimens. As the synthetic images are generated based on design data which represents an ideal and nominal state of the specimen, the synthetic images are expected to be defect-free and thus usable for comparison with runtime inspection images for the purpose of defect detection. Using a synthetic image as reference can significantly reduce image acquisition time during runtime examination, thus improving system throughput.

For instance, an inspection image and the at least one synthetic image can be aligned and compared to each other.

At least one difference image (and/or derivatives thereof, such as grade images) can be generated based on the difference between pixel values of the inspection image, and pixel values derived from the synthetic image. A detection threshold can then be applied to the difference image, and a defect map is produced to show suspected locations on the target die having a high probability of being a true defect (also referred to as a defect of interest (DOI)).

In some further cases, the set of physical properties characterizing the specimen can comprise a defect property indicative of defect spatial distribution on the specimen. For instance, in the example illustrated in FIG. 6, the set of physical properties can further comprise a defect property, in addition to the properties of materials, roughness, and reflectivity, etc. The first ML model can be previously trained using a training set pertaining to a training specimen with a known defect. The known defect can be previously detected, or artificially planted at a predefined location. In such cases, the training set for training the first ML model can comprise design data of the training specimen, a plurality of actual images of the training specimen acquired by the examination tool under the plurality of imaging configurations, and a set of ground truth values for the set of physical properties characterizing the training specimen, which, in particular, includes a ground truth defect map of the specimen.

In such cases, the first ML model, upon being trained, can be used for defect detection for a runtime specimen. By way of example, the first ML model can provide a set of estimated values for the set of physical properties, which includes estimated values for the defect property. For instance, the estimated values for the defect property can be represented as an output defect segmentation map indicative of defect spatial distribution on the specimen.

To conclude, the present disclosure addresses the challenges of lack of detailed physical information characterizing a specimen which may hamper the ability to create accurate image simulation. There is proposed a novel two-step ML based process for generating synthetic images of semiconductor specimens. This approach leverages abstract design data and various imaging configurations of the examination tool to estimate physical properties and generate synthetic images that closely resemble actual images acquired during examination.

Specifically, the first ML model is trained to estimate a set of physical properties characterizing the semiconductor specimen. It processes the design data, a plurality of imaging configurations, and corresponding actual images to predict values for physical properties such as materials, roughness, reflectivity, and, optionally, defect spatial distribution. The second ML model uses the estimated physical properties, along with the design data and new imaging configurations, to generate synthetic images of the specimen. The generated synthetic images can be used for various examination applications, including selecting optimal imaging configurations and serving as defect-free reference images for defect detection.

The proposed solution effectively addresses the lack of detailed physical properties by using the first ML model to infer these properties from available data of design data and imaging configurations. By training on a diverse set of imaging configurations and corresponding actual images, the first ML model learns to identify patterns and correlations that reveal the physical characteristics of the specimen. The proposed ML-based method is capable of accurately mapping design data and varied imaging responses to physical properties and deriving the missing physical information indirectly, thus reducing the dependence on complete and detailed design specifications which are often unavailable due to IP concerns and the abstract nature of CAD data.

In addition, the combination of the two ML models is closely integrated to provide a unique and effective solution to the problem. The first ML model enriches the abstract design data with estimated physical properties, creating a more detailed representation of the specimen. This enriched data is then used by the second ML model to generate synthetic images that accurately simulate the actual imaging process. The seamless integration of these models ensures that the generated synthetic images are highly accurate and useful for various examination applications.

It is to be noted that examples illustrated in the present disclosure, such as, e.g., the exemplified ML models and structures, the exemplary design data, the listed properties and/or parameters, the loss functions, and the training datasets, etc., are illustrated for exemplary purposes, and should not be regarded as limiting the present disclosure in any way. Other appropriate examples/implementations can be used in addition to, or in lieu of the above.

Among technical advantages of certain embodiments of the presently disclosed subject matter as described herein, is the ability to accurately estimate physical properties of a semiconductor specimen from abstract design data. This is enabled by the first ML model, which processes design data, multiple imaging configurations, and corresponding actual images to predict values for physical properties such as materials, roughness, reflectivity, and, optionally, defect spatial distribution. This approach reduces the need for detailed and complete design specifications, which are often unavailable due to Intellectual Property concerns.

Among technical advantages of certain embodiments of the presently disclosed subject matter as described herein, is the generation of highly accurate synthetic images that closely resemble actual images acquired by examination tools under various configurations. This is enabled by the second ML model, which uses the enriched design data with estimated physical properties and new imaging configurations to create synthetic images. In some cases, the model can employ advanced neural network architectures, such as Generative Adversarial Networks (GANs), leveraging both reconstruction loss and adversarial loss to ensure the synthetic images' accuracy and realism. This capability can further enhance the reliability of defect detection and other examination processes using the generated synthetic images.

Among technical advantages of certain embodiments of the presently disclosed subject matter as described herein, is the ability to select optimal imaging configurations for examination tools, thereby improving image quality for subsequent inspections. This advantage is enabled by analyzing the group of synthetic images generated under various new imaging configurations and selecting the one with the best contrast or signal-to-noise ratio (SNR). The corresponding imaging configuration can then be applied to the examination tool for inspecting the specimen and subsequent specimens, ensuring optimal imaging conditions and enhancing the accuracy of defect detection.

Among advantages of certain embodiments of the presently disclosed subject matter as described herein, is the enhanced capability for defect detection using the first ML model by including a defect property in the set of physical properties. This is enabled by training the first ML model with a training set that includes design data, actual images acquired under various imaging configurations, and ground truth defect maps of the training specimen (as part of the set of ground truth values for the set of physical properties). By incorporating defect spatial distribution as part of the physical properties, the first ML model can provide estimated values for defect properties in the form of output defect segmentation maps. These maps indicate the spatial distribution of defects on the specimen, allowing for early identification and detection of defects.

Additionally, certain embodiments of the presently disclosed subject matter offer enhanced examination efficiency by significantly reducing image acquisition time during runtime examinations. This advantage is enabled by the use of synthetic images as reference images for defect-related examinations. Since the synthetic images are generated based on design data representing an ideal and nominal state of the specimen, they are expected to be defect-free and thus usable for comparison with runtime inspection images. This reduces the need for acquiring real reference images during each inspection cycle, thereby improving system throughput and overall examination efficiency.

Moreover, certain embodiments of the presently disclosed subject matter improve the overall accuracy and reliability of defect detection. This is enabled by the integrated use of two ML models: the first ML model estimates the physical properties, and the second ML model uses this enriched data to generate accurate synthetic images. The combination of these models ensures that the synthetic images closely resemble actual images, providing a reliable basis for detecting true defects and minimizing false alarms. This integrated approach enhances the effectiveness of the semiconductor inspection process, leading to higher quality and yield in semiconductor manufacturing.

It is to be understood that the present disclosure is not limited in its application to the details set forth in the description contained herein or illustrated in the drawings.

In the present detailed description, numerous specific details are set forth in order to provide a thorough understanding of the disclosure. However, it will be understood by those skilled in the art that the presently disclosed subject matter may be practiced without these specific details. In other instances, well-known methods, procedures, components, and circuits have not been described in detail so as not to obscure the presently disclosed subject matter.

Unless specifically stated otherwise, as apparent from the present discussions, it is appreciated that throughout the specification discussions utilizing terms such as "obtaining", "examining", "simulating", "processing", "using", "providing", "feeding", "selecting", "acquiring", "configuring", "training", "optimizing", or the like, refer to the action(s) and/or process(es) of a computer that manipulate and/or transform data into other data, said data represented as physical, such as electronic, quantities and/or said data representing the physical objects.

The terms "computer", "computer-based system" or "computerized system" should be expansively construed to cover any kind of hardware-based electronic device with a data processing circuitry (e.g., digital signal processor (DSP), a graphics processing unit (GPU), a field programmable gate array (FPGA), including, by way of non-limiting example, the examination system, the image simulation system, and respective parts thereof disclosed in the present application. The data processing circuitry (designated also as processing circuitry) can comprise, for example, one or more processors operatively connected to computer memory, loaded with executable instructions for executing operations, as further described below. The data processing circuitry encompasses a single processor or multiple processors, which may be located in the same geographical zone, or may, at least partially, be located in different zones, and may be able to communicate together.

The one or more processors referred to herein can represent one or more general-purpose processing devices such as a microprocessor, a central processing unit, or the like. More particularly, a given processor may be one of a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The one or more processors may also be one or more special-purpose processing devices such as an application specific integrated circuit (ASIC), a field programmable gate array (FPGA), a digital signal processor (DSP), a network processor, or the like. The one or more processors are configured to execute instructions for performing the operations and steps discussed herein.

The memories referred to herein can comprise one or more of the following: internal memory, such as, e.g., processor registers and cache, etc., main memory such as, e.g., read-only memory (ROM), flash memory, dynamic random access memory (DRAM) such as synchronous DRAM (SDRAM) or Rambus DRAM (RDRAM), etc.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of data and/or instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review, and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying, and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination", or its derivatives used in this specification, is not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology", or derivatives thereof used in this specification, is not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "defect candidate" used in this specification should be expansively construed to cover a suspected defect location on the specimen which is detected to have relatively high probability of being a defect of interest (DOI). Therefore, a DOI candidate, upon being reviewed/tested, may actually be a DOI, or, in some other cases, it may be nuisances, or random noise that can be caused by different variations (e.g., process variation, color variation, mechanical and electrical variations, etc.) during inspection.

The term "runtime" used in this specification should be expansively construed to cover the on-line inspection/examination process in the fabrication plant (FAB) where production wafers are fabricated. In the context of ML-based defect examination in semiconductor specimens, "runtime" refers to the phase during which a trained ML model/network is employed to analyze new, unseen runtime images of semiconductor specimens. This phase occurs after the ML model has been fully trained and is in use for actual defect-examination related operations in a production or operational environment. In contrast, a training or setup phase refers to the phase during which the ML model is developed and optimized to perform its intended task related to defect examination prior to its deployment in runtime/production phase.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

The term "image(s)" or "image data" used in the specification should be expansively construed to cover any original images/frames of the specimen captured by an examination tool during the fabrication process, derivatives of the captured images/frames obtained by various pre-processing stages, and/or computer-generated synthetic images (in some cases based on design data). Depending on the specific way of scanning (e.g., one-dimensional scan such as line scanning, two-dimensional scan in both x and y directions, or dot scanning at specific spots, etc.), image data can be represented in different formats, such as, e.g., as a gray level profile, a two-dimensional image, or discrete pixels, etc. It is to be noted that in some cases the image data referred to herein can include, in addition to images (e.g., captured images, processed images, etc.), numeric data associated with the images (e.g., metadata, hand-crafted attributes, etc.). It is further noted that images or image data can include data related to a processing step/layer of interest, or a plurality of processing steps/layers of a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the present detailed description, numerous specific details are set forth in order to provide a thorough understanding of the methods and apparatus.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized system of image simulation for a semiconductor specimen, the system comprising a processing circuitry configured to:

obtain design data of the semiconductor specimen;

obtain a plurality of actual images of the specimen acquired by an examination tool under a plurality of imaging configurations;

process the design data, the plurality of imaging configurations, and the plurality of actual images by a first machine learning (ML) model, to obtain a set of estimated values for a set of physical properties characterizing the specimen, the set of physical properties being expected to result in varied image responses upon the specimen being imaged under different imaging configurations of the examination tool; and process, by a second ML model, the design data, the set of estimated values, and a group of new imaging configurations of the examination tool, to obtain a group of synthetic images of the specimen simulating actual images acquired under the group of new imaging configurations.

2. The computerized system according to claim 1, wherein the examination tool is an optical tool, and a given imaging configuration of the optical tool is characterized by values of a set of optical parameters comprising polarization, laser intensity, wavelength, and Coherent Light Control (CLC) masking.

3. The computerized system according to claim 1, wherein the set of physical properties comprises material properties, roughness, reflectivity, depth, thickness, and pattern direction.

4. The computerized system according to claim 1, wherein the first ML model is previously trained under supervised learning, using a training set comprising design data of a training specimen, a plurality of actual images of the training specimen acquired by the examination tool under the plurality of imaging configurations, and a set of ground truth values for the set of physical properties for the training specimen.

5. The computerized system according to claim 4, wherein the first ML model is previously trained by:

feeding the design data and the plurality of actual images of the training specimen with the plurality of imaging configurations as input to the first ML model, to obtain a set of predicted values for the set of physical properties for the training specimen; and optimizing the first ML model using a loss function, based on the set of predicted values and the set of ground truth values for the set of the physical properties for the training specimen.

6. The computerized system according to claim 1, wherein the first ML model is previously trained under unsupervised learning, using a training set comprising design data of a training specimen, and a plurality of actual images of the training specimen acquired by the examination tool under the plurality of imaging configurations.

7. The computerized system according to claim 6, wherein the first ML model is previously trained by:

processing the design data of the training specimen, by a first subnetwork of the first ML model, to extract features representative of a set of predicted values for the set of physical properties;

processing, by a second subnetwork of the first ML model, the plurality of imaging configurations and the extracted features, to obtain a plurality of predicted images of the training specimen corresponding to the plurality of imaging configurations; and optimizing the first ML model using a loss function, based on the plurality of actual images and the plurality of predicted images of the training specimen.

8. The computerized system according to claim 1, wherein the second ML model is trained upon the first ML model being trained, using a training set comprising design data of a training specimen, a set of estimated values for the set of physical properties for the training specimen provided by the first ML model, and a group of ground truth actual images acquired under the group of new imaging configurations of the examination tool.

9. The computerized system according to claim 8, wherein the second ML model is trained by:

processing, by the second ML model, the design data of the training specimen, the group of new imaging configurations, and the set of estimated values for the set of physical properties for the training specimen, to obtain a group of predicted synthetic images; and optimizing the second ML model using a loss function based on the group of predicted synthetic images and the group of ground truth actual images.

10. The computerized system according to claim 1, wherein the set of estimated values for the set of physical properties are outputted by the first ML model in a form of a set of output segmentation maps, each output segmentation map of the set of output segmentation maps corresponding to a specific physical property and representative of the design data enriched by estimated values of the specific physical property.

11. The computerized system according to claim 1, wherein the processing circuitry is further configured to select, from the plurality of imaging configurations, an optimal imaging configuration based on the group of synthetic images, and configure the examination tool with the optimal imaging configuration for examining the specimen and one or more subsequent specimens.

12. The computerized system according to claim 1, wherein at least one synthetic image from the group of synthetic images is usable as a reference image for defect-related examination of the specimen and one or more subsequent specimens.

13. The computerized system according to claim 1, wherein the set of physical properties comprises a defect property indicative of defect spatial distribution on the specimen, and wherein the first ML model is previously trained using a training set pertaining to a training specimen with a known defect, the training set comprising design data of the training specimen, a plurality of actual images of the training specimen acquired by the examination tool under the plurality of imaging configurations, and a set of ground truth values for the set of physical properties for the training specimen, the set of ground truth values including a ground truth defect map of the training specimen.

14. A computerized method of image simulation for a semiconductor specimen, comprising:

obtaining design data of the semiconductor specimen;

obtaining a plurality of actual images of the specimen acquired by an examination tool under a plurality of imaging configurations;

processing the design data, the plurality of imaging configurations and the plurality of actual images by a first machine learning (ML) model, to obtain a set of estimated values for a set of physical properties characterizing the specimen, the set of physical properties being expected to result in varied image responses upon the specimen being imaged under different imaging configurations of the examination tool; and processing, by a second ML model, the design data, the set of estimated values, and a group of new imaging configurations of the examination tool, to obtain a group of synthetic images of the specimen simulating actual images acquired under the group of new imaging configurations.

15. The computerized method according to claim 14, wherein the first ML model is previously trained under supervised learning, using a training set comprising design data of a training specimen, a plurality of actual images of the training specimen acquired by the examination tool under the plurality of imaging configurations, and a set of ground truth values for the set of physical properties for the training specimen.

16. The computerized method according to claim 14, wherein the second ML model is trained upon the first ML model being trained, using a training set comprising design data of a training specimen, a set of estimated values for the set of physical properties for the training specimen provided by the first ML model, and a group of ground truth actual images acquired under the group of new imaging configurations of the examination tool.

17. The computerized method according to claim 14, wherein the set of estimated values for the set of physical properties are outputted by the first ML model in a form of a set of output segmentation maps, each output segmentation map of the set of output segmentation maps corresponding to a specific physical property and representative of the design data enriched by estimated values of the specific physical property.

18. The computerized method according to claim 14, further comprising: selecting, from the plurality of imaging configurations, an optimal imaging configuration based on the group of synthetic images, and configuring the examination tool with the optimal imaging configuration for examining the specimen and one or more subsequent specimens.

19. The computerized method according to claim 14, wherein the set of physical properties comprises a defect property indicative of defect spatial distribution on the specimen, and wherein the first ML model is previously trained using a training set pertaining to a training specimen with a known defect, the training set comprising design data of the training specimen, a plurality of actual images of the training specimen acquired by the examination tool under the plurality of imaging configurations, and a set of ground truth values for the set of physical properties for the training specimen, the set of ground truth values including a ground truth defect map of the training specimen.

20. A non-transitory computer readable storage medium tangibly embodying a program of instructions that, when executed by a computer, cause the computer to perform a method of image simulation for a semiconductor specimen, the method comprising:

obtaining design data of the semiconductor specimen;

obtaining a plurality of actual images of the specimen acquired by an examination tool under a plurality of imaging configurations;

processing the design data, the plurality of imaging configurations, and the plurality of actual images by a first machine learning (ML) model, to obtain a set of estimated values for a set of physical properties characterizing the specimen, the set of physical properties being expected to result in varied image responses upon the specimen being imaged under different imaging configurations of the examination tool; and processing, by a second ML model, the design data, the set of estimated values, and a group of new imaging configurations of the examination tool, to obtain a group of synthetic images of the specimen simulating actual images acquired under the group of new imaging configurations.

* * * * *